G. SPALDING.
TILLING MACHINE.
APPLICATION FILED DEC. 30, 1908.
942,469.
Patented Dec. 7, 1909.
2 SHEETS—SHEET 1.
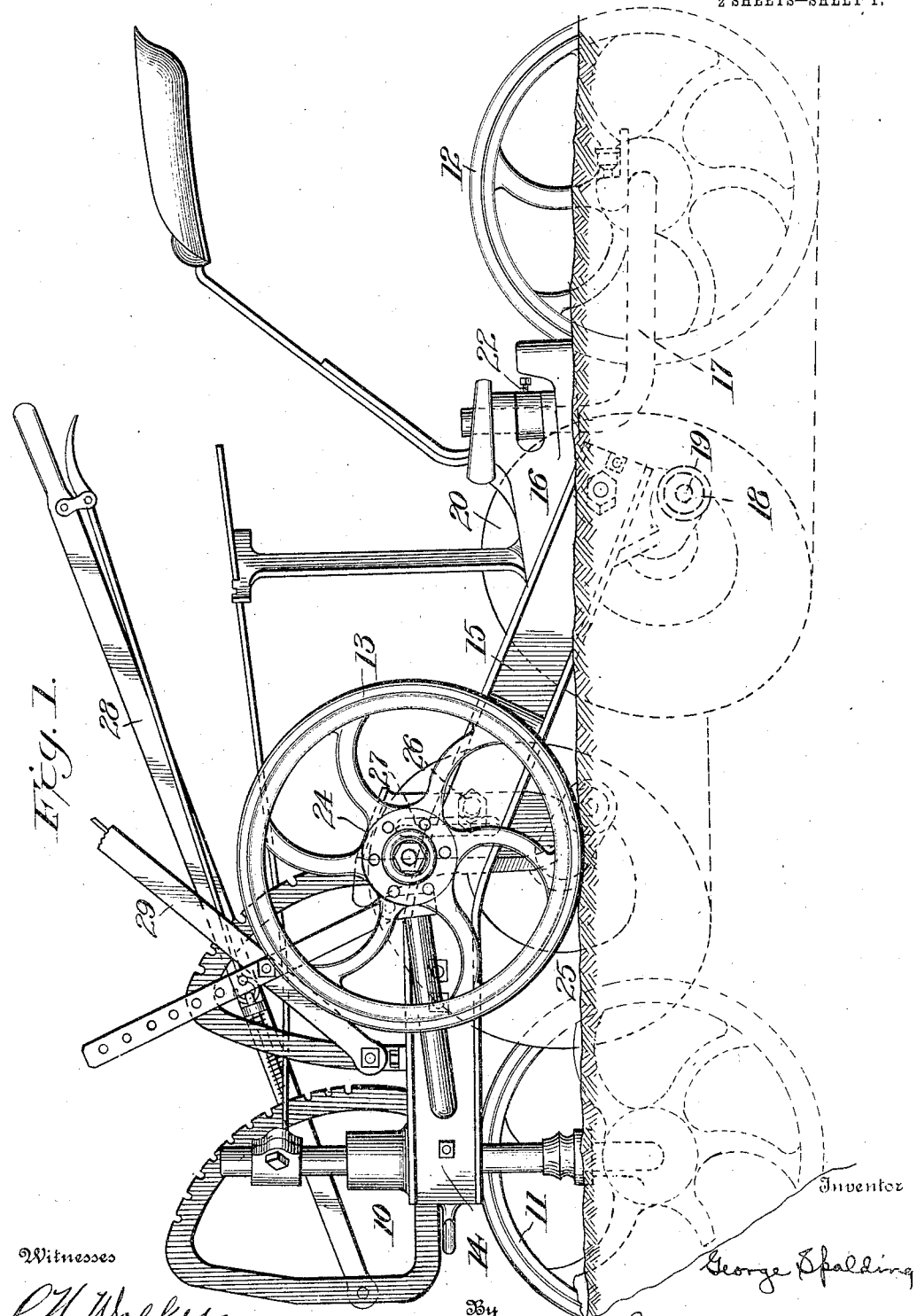

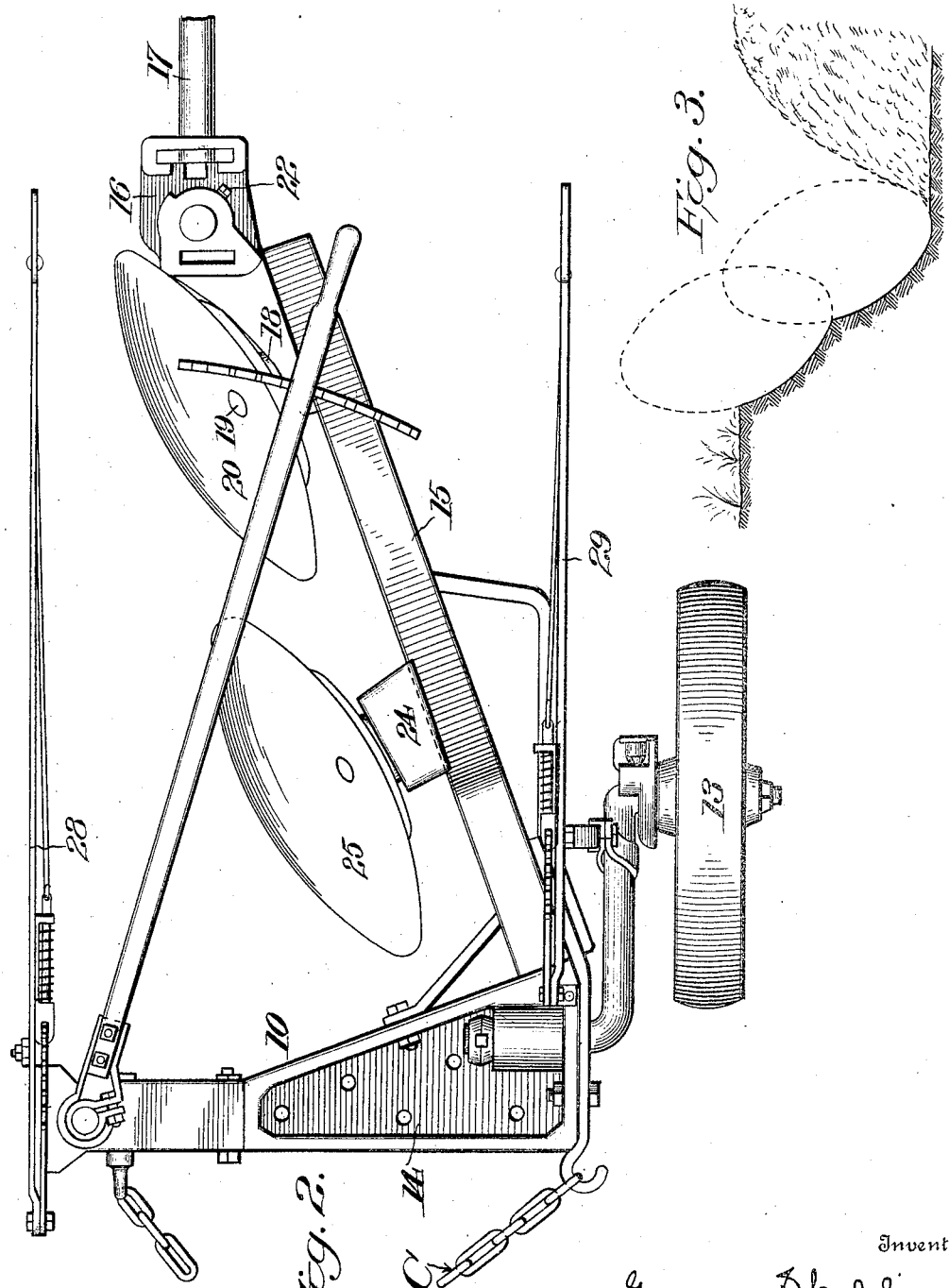

UNITED STATES PATENT OFFICE.

GEORGE SPALDING, OF STOCKTON, CALIFORNIA.

TILLING-MACHINE.

942,469.  Specification of Letters Patent.  Patented Dec. 7, 1909.

Application filed December 30, 1908. Serial No. 470,035.

*To all whom it may concern:*

Be it known that I, GEORGE SPALDING, of Stockton, in the county of San Joaquin, State of California, have invented certain new and useful Improvements in Tilling-Machines, of which the following is a specification.

This invention relates to a mechanical device or machine for tilling the earth, the same being designed as an improvement upon the rotary disk plow illustrated and described in Letters Patent 793,240, granted to me July 27, 1905.

The invention has for its object the provision of means whereby a plurality of rotary concaved disks may be mounted in succession on a suitable frame, the main feature of the invention comprising the relative positions in which the disks are placed and carried, when the machine is in operation.

A further object is to provide improved means for plowing, disintegrating and pulverizing the earth to greater depths than has been generally practiced in agriculture.

The invention will be hereinafter fully set forth and particularly pointed out in the claims.

In the accompanying drawings:—Figure 1 is a side elevation illustrating my improved tilling machine. Fig. 2 is a plan view thereof. Fig. 3 is a detail view illustrating the operation of the disks.

Referring to the drawings 10 designates a frame supported upon front and rear furrow wheels 11, 12, respectively, and upon a land wheel 13. Frames of different patterns or forms may be used, but preferably a metal frame is employed, having two principal members 14, 15, the member 14, when the machine is in operation, being carried in a horizontal position, or thereabout, transverse the furrow to be plowed, and sufficiently high to pass over weeds or trash without clogging. The front furrow wheel 11 is attached to one end of the member 14 and a secure attachment is made between said member 14 and the front end of the other principal member 15 of the frame, which member 15 is preferably made of a steel I-beam, and is known as the "backbone." The backbone is so joined with the member 14 that there is an angle formed between them which corresponds, approximately, with the greater of the two acute angles of a right angle triangle, (where the sides forming the right angles are of unequal length) if the backbone be regarded as in the position of the hypotenuse. The backbone is extended to the rear of the other member and is inclined downward. The land wheel 13 is attached to the backbone on its side farthest from the front furrow wheel. At the rear end of the backbone an attachment is made at 16 between it and an arm 17 which supports the rear furrow wheel 12, and the disks are attached to the backbone on its under side—that is to say, on the side next to the plowed ground, when the machine is in operation.

Near the rear end of the backbone a journal bearing 18 is securely attached in which is carried the journal 19 of the rear disk 20; the arm 17 is secured in position at 16 by a collar and set screw 22, whereby said arm may be raised or lowered, and thereby adjust the rear furrow wheel 12 and hold the same at a desired elevation with respect to the rear end of the backbone, so that the rear furrow wheel will run in the bottom of and along the furrow, which the rear disk will cut, the purpose being to have the rear furrow wheel aid in controlling the depth of the furrow cut by the rear disk, as well as to aid in carrying the loads and strains incident to operation.

On the inside of backbone 12 is mounted the standard 24 carrying the journal for the front disk 25. Said standard is secured in position by means of a bolt 26 passing through a slot of said standard, whereby the standard may be raised or lowered with respect to the backbone and be rigidly and securely held in any adjusted position. I have found in practice that the best results are secured by placing the journal of the front disk from twenty to twenty-four inches ahead of the journal of the rear disk, but do not desire to limit myself in this connection as the distance may be varied.

Rotary disks of different forms and of various dimensions may be used, but as a rule, disks made of sheet steel, of about one eighth of an inch in thickness, in the form of a slice of a hollow sphere, and being twenty-four inches, more or less, in diameter across the face, and dished three and one half inches, or thereabout, in the center, are preferred. The disks employed are beveled around their rims, so as to afford them keen cutting edges, each disk as mounted being tilted back at its top, with the plane of its face, on the side next to the plowed ground, deflected to the rear. Each disk when in use acts as a revolving gouge and is set to follow in the lead of its cutting edge along the vertical wall and bottom of its furrow, as nearly as may be, and each disk is capable of cutting a furrow, which in depth is equal to one half of the diameter of the disk, or nearly so.

Pivoted levers or arms 28, 29, are provided for raising or lowering the frame with respect to the front furrow wheel 11 and the land wheel 13, and means are provided at 22 for adjusting the vertical position of the frame with respect to the rear furrow wheel.

When the machine is in use and after a preliminary furrow has been cut, the wheel 11 runs at the front corner of the implement, along the bottom of the last preceding open furrow; the wheel 13 (called the land wheel) runs on the unplowed ground at the side of the machine, and the wheel 12 (called the rear furrow wheel) runs along and in the furrow made by the machine and immediately behind the rear or deep cutting disk.

In operation the journal bearing of the front disk is so adjusted that said front disk will cut a furrow to about one half as great a depth from the surface of the ground as the furrow cut by the rear disk. Provision is made for attaching horses, or other motive power, by means of a chain C, connected with the front side of the transverse member 11 of the frame, and it will be observed that the depth to which the disks will cut depends on the line of draft, the adjustments of the frame with respect to the front furrow wheel and the land wheel, (by means of their respective levers) and also upon the adjustment between the rear end of the backbone and the rear furrow wheel, as well as upon the nature and character of the earth in which the work is being done.

The principal feature in the invention herein described is that the front disk is placed and carried ahead of, partly to one side of the path of, and to cut on a higher level or plane than the rear disk, and so that after a preliminary furrow has been cut, and the machine is in operation, the relative positions of the disks is such that the furrow cut by the front disk leaves space of sufficient width between the vertical wall of the furrow and the plowed ground, in which to accommodate the rear disk and its rearwardly extended journal together with its journal bearing and the support therefor, and to permit the rear disk to cut in depth to its full capacity.

As indicated by the drawings, when the disks are set and used in their relative positions, as before described, each cuts a furrow, which in cross section, is of the form of an end of an ellipse, having one of its axes about one-fourth shorter than the other, and when each disk is set to cut eight inches or thereabout in depth, the cutting edge of the rear disk passes through the middle of the bottom of the furrow made by the front disk. It will be apparent, however, that the relative position of the disks with respect to each other, as well as the forms of the cross sections of their respective furrows may be changed considerably. This may be done, either by adjusting the front disk up or down, by means of its standard, so as to cut its furrow relatively shallower or deeper; or, by raising or lowering the frame with respect to either the front furrow wheel or the land wheel, or both, and which may be done without interfering with, or preventing the successful operation of the machine. One limitation in such changes of position must be observed, however, and that is that the disks be so set with respect to each other, that in operation either the rear disk must be sufficiently dished to admit its journal in its own furrow; or the front or leading disk must cut sufficient of its furrow to the side of the path of the rear disk, so that it and its journal run therein, and permit the rear disk to cut to the depth desired, without the rear end of its journal rubbing or scraping too severely against the vertical wall of the furrow made by it. The setting of the front disk partly to the side of the path of the rear one is also desirable for the reason that when set to the side it is in better position to turn the earth from its furrow into the bottom of the last preceding furrow, than if the front disk were closer to the open furrow and had less space or distance within which to turn the earth from its furrow and deposit the same within the last preceding open furrow.

Another feature of this invention, and which is of prime importance, is that the front disk is carried sufficiently ahead of the rear disk, so that the earth plowed by the front disk is moved laterally and turned into the bottom of the open furrow left behind the rear disk in the last preceding operation of the implement, and not cast into the face or path of the rear disk, or, thrown on top of the earth to be plowed by the rear disk.

The chief advantage of this invention lies in the fact that the machine herein described and claimed as new is light in draft, for the reason that in operation the front disk turns the earth plowed from the surface, with its accompanying trash into the bottom of the last preceding furrow, and the rear disk, cutting beneath the furrow made by the front disk, turns the earth from the bottom upon the earth plowed from the surface, and as a result, the wornout surface, with its trash, is more thoroughly turned under, the new and virgin earth is brought on top, and a new and better means of tilling the earth is provided, than any heretofore known.

In the drawings the disks are shown facing from the backbone to the right hand side as the machine is carried forward. Devices of this type are known as right hand machines, and in operation are designed to be turned to the left. It is obvious that by changing the position of the parts a like kind of left hand machine may be made. It is also obvious that by lengthening the backbone one or more disks may be mounted thereon in succession by duplicating the standard 24, each standard being placed ahead of the standard for the next successive disk, with each one set in the same relative position as to its next following disk, that the front disk heretofore described bears to the rear disk.

It is not desired to claim hereunder any protection for the frame mentioned, but it is intended to claim the said frame in a separate application, wherein the same will be described more in detail and its features and advantages fully set forth.

I claim as my invention:—

1. A tilling machine having a plurality of rotary disks mounted in succession with each disk in advance, higher than, and partly to the land side of its next following disk, and with each disk spaced apart from its next following disk and so arranged as to be substantially out of the path of movement of the earth as lifted and turned by such following disk, and with said disks so arranged that the earth plowed by each disk is discharged by it ahead of and outside of the face of its next following disk.

2. A tilling machine having a plurality of rotary disks mounted in succession with each disk in advance, higher than, and partly to the land side of its next following disk, and with each disk spaced apart from its next following disk and so arranged as to be substantially out of the path of movement of the earth as lifted and turned by such following disk, and with said disks so arranged that the earth plowed by each disk is discharged by it ahead of and outside of the face of its next following disk, and means for varying the relative positions of said disks.

3. A tilling machine having a plurality of rotary disks mounted in succession, with each disk except the rear one entirely in advance of the next following disk, and higher than, and partly to the land side of the said next following disk, the face of each disk being set to discharge its earth free from conflict with the earth discharged by the next preceding disk.

4. A tilling machine having a plurality of rotary disks mounted in succession, the axis of each disk being in advance, to the land side, and above the axis of the next succeeding disk and so angled and tilted that the delivery edge of each disk is substantially in advance and to one side of the cutting edge of the next succeeding disk, each disk being set to discharge its earth free from conflict with the earth discharged by the next preceding disk.

In testimony whereof, I have signed this specification in the presence of two subscribing witnesses.

GEORGE SPALDING.

Witnesses:
  CHAS. E. RIORDAN,
  WM. S. HODGES.